(12) United States Patent
Troia

(10) Patent No.: US 12,705,183 B2
(45) **Date of Patent: *Aug. 11, 2026**

(54) METHODS OF MEMORY ADDRESS VERIFICATION AND MEMORY DEVICES EMPLOYING THE SAME

(71) Applicant: Lodestar Licensing Group LLC, Evanston, IL (US)

(72) Inventor: Alberto Troia, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,900

(22) Filed: Nov. 27, 2024

(65) Prior Publication Data

US 2025/0094354 A1 Mar. 20, 2025

Related U.S. Application Data

(63) Continuation of application No. 18/306,110, filed on Apr. 24, 2023, now Pat. No. 12,164,437, which is a continuation of application No. 17/397,449, filed on Aug. 9, 2021, now Pat. No. 11,663,140, which is a continuation of application No. 15/687,069, filed on Aug. 25, 2017, now Pat. No. 11,086,790.

(51) Int. Cl.
*G06F 12/1018* (2016.01)
*G06F 3/06* (2006.01)
*G06F 12/02* (2006.01)

(52) U.S. Cl.
CPC .......... *G06F 12/1018* (2013.01); *G06F 3/061* (2013.01); *G06F 3/0655* (2013.01); *G06F 3/0688* (2013.01); *G06F 12/0246* (2013.01); *G06F 2212/7201* (2013.01)

(58) Field of Classification Search
CPC ................. G06F 3/061; G06F 12/1018; G06F 2212/7201
See application file for complete search history.

(56) References Cited

U.S. PATENT DOCUMENTS 3,963,908 A 6/1976 Das
5,561,765 A 10/1996 Shaffer et al.
5,717,871 A 2/1998 Hsieh et al.
(Continued)

FOREIGN PATENT DOCUMENTS

CN 1832049 A 9/2006
WO 2005/066794 A2 7/2005

OTHER PUBLICATIONS

"International Search Report and Written Opinion of the International Searching Authority," issued in connection with Int'l Appl. No. PCT/US2018/042679, dated Nov. 14, 2018 (12 pages).
(Continued)

*Primary Examiner* — Nicholas A. Paperno

(57) ABSTRACT

A memory device and methods for operating the same are provided. The memory device includes an array of memory cells, a non-volatile memory, and a controller. The controller is configured to receive a read command to read a data word from an address of the array and decode the address to generate a decoded address. The controller is further configured to retrieve response data from the decoded address of the array, retrieve a location indicia corresponding to the decoded address from the non-volatile memory, and verify that the location indicia corresponds to the address. The controller can optionally be further configured to indicate an error if the location indicia does not correspond to the address.

20 Claims, 5 Drawing Sheets

(56) References Cited

U.S. PATENT DOCUMENTS

| | | | |
|---|---|---|---|
| 7,203,890 | B1 | 4/2007 | Normoyle |
| 8,086,790 | B2 | 12/2011 | Roohparvar |
| 8,427,867 | B2 | 4/2013 | Weingarten |
| 8,976,594 | B2 | 3/2015 | Tanzawa |
| 9,047,191 | B2 | 6/2015 | Bueb et al. |
| 9,158,612 | B2 | 10/2015 | Roohparvar et al. |
| 9,230,658 | B2 | 1/2016 | Han |
| 9,368,223 | B2 | 6/2016 | Jung et al. |
| 9,454,496 | B2 | 9/2016 | Lim |
| 10,261,914 | B2 | 4/2019 | Troia |
| 10,482,030 | B2 | 11/2019 | Troia |
| 2002/0166038 | A1 | 11/2002 | Macleod |
| 2006/0069896 | A1 | 3/2006 | Sanders |
| 2006/0156191 | A1 | 7/2006 | Driediger |
| 2006/0215297 | A1 | 9/2006 | Kikuchi |
| 2009/0037782 | A1 | 2/2009 | Hughes |
| 2010/0146219 | A1 | 6/2010 | Chun et al. |
| 2010/0262739 | A1 | 10/2010 | Durham et al. |
| 2013/0159629 | A1 | 6/2013 | Sadri et al. |
| 2014/0040697 | A1 | 2/2014 | Loewenstein |
| 2014/0149833 | A1 | 5/2014 | Sauber et al. |
| 2014/0244586 | A1 | 8/2014 | Ngo |
| 2014/0289575 | A1 | 9/2014 | Sutardja et al. |
| 2015/0169570 | A1 | 6/2015 | Shim et al. |
| 2016/0027481 | A1 | 1/2016 | Hong |
| 2016/0350241 | A1 | 12/2016 | Ichimura et al. |
| 2019/0065396 | A1 | 2/2019 | Troia |
| 2019/0171579 | A1 | 6/2019 | Troia |
| 2020/0057730 | A1 | 2/2020 | Troia |

OTHER PUBLICATIONS

Bach, M., “Technology Primer: Low Voltage RAM”, Jul. 16, 2012, Puget Systems, 2012, 5 pages, retrieved Nov. 14, 2018 from: https://pugetsystems.com/labs/articles/technology-primer-low-voltage-ram-150/.

Bach, Technology Primer: Low Voltage RAM, Puget Systems, 2012 [retrieved from internet Nov. 7, 2018][<URL: https://www.anandtech.com/show/7594/samsung-ssd-840-evo-msata-120gb-250gb-500gb-1tb-review/8>] (Year: 2012).

CN Patent Application No. 201880034599.7—Chinese Office Action and Search Report, dated Apr. 20, 2020, with English Translation, 12 pages.

CN Patent Application No. 201880034599.7—Chinese Office Action, dated Aug. 25, 2021, with English Translation, 18 pages.

EP Patent Application No. 18848662.5—Extended European Search Report, dated Jun. 23, 2020, 10 pages.

International Application No. PCT/US2018/042691—International Search Report and Written Opinion, dated Nov. 27, 2018, 19 pages.

Office Action dated Mar. 24, 2021 for Chinese Patent Application No. 201880034599.7, 18 pages (with translation).

Troia, A., Unpublished United States Patent Application entitled “Methods of Memory Address Verification and Memory Devices Employing the Same”, filed Aug. 25, 2017, 26 pages.

Vatto, K., “Samsung SSD 840 EVO mSATA (120GB, 250GB, 500GB & 1TB) Review”, AnandTech, Jan. 9, 2014, 5 pages, retrieved Nov. 14, 2018 from: https://www.anandtech.com/show/7594/samsung-ssd-840-evo-msata-120gb-250gb-500gb-1tb-review/8.

METHODS OF MEMORY ADDRESS VERIFICATION AND MEMORY DEVICES EMPLOYING THE SAME

CROSS-REFERENCE TO RELATED APPLICATIONS

This application is a continuation of U.S. patent application Ser. No. 18/306,110, filed Apr. 24, 2023, which is a continuation of U.S. patent application Ser. No. 17/397,449, filed Aug. 9, 2021, which is a continuation of U.S. patent application Ser. No. 15/687,069, filed Aug. 25, 2017, now U.S. Pat. No. 11,086,790, each of which is incorporated herein by reference in its entirety.

This application contains subject matter related to an U.S. Patent Application by Alberto Troia, entitled "METHODS OF MEMORY ADDRESS VERIFICATION AND MEMORY DEVICES EMPLOYING THE SAME." The related application, of which the disclosure is incorporated by reference herein, is assigned to Micron Technology, Inc., and is identified as U.S. application Ser. No. 15/687,169, filed Aug. 25, 2017, now U.S. Pat. No. 10,261,914.

TECHNICAL FIELD

The present disclosure generally relates to memory devices, and more particularly relates to methods of memory address verification and memory devices employing the same.

BACKGROUND

Memory devices are frequently provided as internal, semiconductor, integrated circuits and/or external removable devices in computers or other electronic devices. There are many different types of memory, including volatile and non-volatile memory. Volatile memory, including random-access memory (RAM), static random access memory (SRAM), dynamic random access memory (DRAM), and synchronous dynamic random access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), resistive random access memory (RRAM), and magnetic random access memory (MRAM), among others.

Memory devices can include large arrays of memory cells for storing data, frequently organized into rows and columns. Individual memory cells and/or ranges of memory cells can be addressed by their row and column. When a memory array is addressed, there may be one or more layers of address translation, to e.g., translate between a logical address utilized by a host device and a physical address corresponding to a location in the memory array. Although uncommon, it is possible for the address information provided to a memory device on a command/address bus thereof to be corrupted by an error, such that an internal operation of the memory device (e.g., a read operation, a write operation, an erase operation, etc.) can be performed on a different physical address than was requested by a host device. Accordingly, a way to verify that a memory operation has been performed at the intended address is required.

DETAILED DESCRIPTION

In the following description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory devices are not shown, or are not described in detail, to avoid obscuring other aspects of the technology. For example, several functional components of memory devices and/or memory systems that are well-known to those skilled in the art are not discussed in detail below (e.g., circuit components such as multiplexers and decoders, data structures such as address registers and data registers, etc.). In general, it should be understood that various other devices, systems, and methods in addition to those specific embodiments disclosed herein may be within the scope of the present technology.

As discussed above, errors that affect address information provided to a memory device on a command/address bus (e.g., during address translation, during command/address bus operations, etc.) can cause a memory operation to be performed at a different physical address than is desired. Accordingly, several embodiments of memory devices in accordance with the present technology verify the address on which a read operation is performed corresponds to the address from which data has been requested by a controller and/or a host device.

Several embodiments of the present technology are directed to memory devices, systems including memory devices, and methods of operating memory devices. In one embodiment, a memory device is provided. The memory device includes an array of memory cells, a non-volatile memory, and a controller. The controller is configured to receive a read command to read a data word from an address of the array and decode the address to generate a decoded address. The controller is further configured to retrieve response data from the decoded address of the array, retrieve a location indicia corresponding to the decoded address from the non-volatile memory, and verify that the location indicia corresponds to the address. If the location indicia does not correspond to the address, the controller can be further configured to indicate an error.

Figure 1:
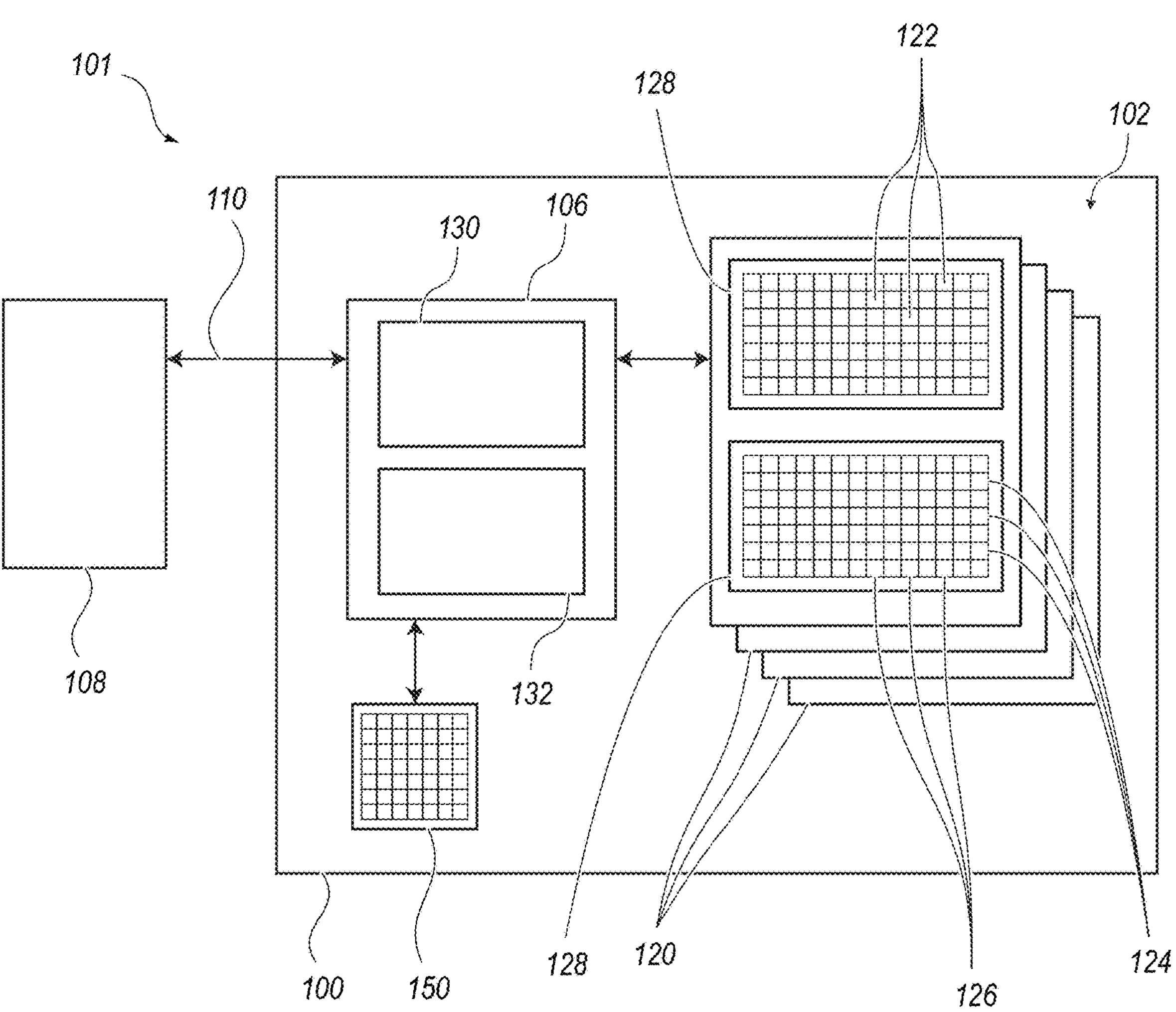
FIG. 1 is a block diagram illustrating a memory system in accordance with an embodiment of the present technology.

FIG. 1 is a block diagram of a system 101 having a memory device 100 configured in accordance with an embodiment of the present technology. As shown, the memory device 100 includes a main memory 102 (e.g., a volatile memory such as DRAM, SRAM or the like, or a non-volatile memory such as NAND flash, NOR flash, chalcogenide PCM, etc.) and a controller 106 operably coupling the main memory 102 to a host device 108 (e.g., an upstream central processor (CPU)). The main memory 102 includes a plurality of memory regions, or memory units 120, which each include a plurality of memory cells 122. Memory units 120 can be individual memory dies, memory planes in a single memory die, a stack of memory dies vertically connected with through-silicon vias (TSVs), or the like. For example, in one embodiment, each of the memory units 120 can be formed from a semiconductor die and arranged with other memory unit dies in a single device package (not shown). In other embodiments, multiple memory units 120 can be co-located on a single die and/or distributed across multiple device packages. The memory cells 122 can include, for example, floating gate, charge trap, phase change, ferroelectric, magnetoresistive, and/or other suitable storage elements configured to store data persistently or semi-persistently. The main memory 102 and/or the individual memory units 120 can also include other circuit components (not shown), such as multiplexers, decoders, buffers, read/write drivers, address registers, data out/data in registers, etc., for accessing and/or programming (e.g., writing) the memory cells 122 and other functionality, such as for processing information and/or communicating with the controller 106.

Memory cells 122 can be arranged in rows 124 (e.g., each corresponding to a word line) and columns 126 (e.g., each corresponding to a bit line). Each word line can include one or more memory pages, depending upon the number of data states the memory cells 122 of that word line are configured to store. For example, a single word line of memory cells 122 in which each memory cell 122 is configured to store one of two data states (e.g., SLC memory cells configured to store one bit each) can include a single memory page. Alternatively, a single word line of memory cells 122 in which each memory cell 122 is configured to store one of four data states (e.g., MLC memory cells configured to store two bits each) can include two memory pages. Moreover, memory pages can be interleaved so that a word line comprised of memory cells 122 in which each memory cell 122 is configured to store one of two data states (e.g., SLC memory cells) can span two memory pages, in an "even-odd bit line architecture," where all the memory cells 122 in odd-numbered columns 126 of a single word line are grouped as a first memory page, and all the memory cells 122 in even-numbered columns 126 of the same word line are grouped as a second memory page. When even-odd bit line architecture is utilized in a word line of memory cells 122 in which each memory cell 122 is configured to store larger numbers of data states (e.g., memory cells configured as MLC, TLC, QLC, etc.), the number of memory pages per word line can be even higher (e.g., 4, 6, 8, etc.).

Each column 126 can include a string of series-coupled memory cells 122 connected to a common source. The memory cells 122 of each string can be connected in series between a source select transistor (e.g., a field-effect transistor) and a drain select transistor (e.g., a field-effect transistor). Source select transistors can be commonly coupled to a source select line, and drain select transistors can be commonly coupled to a drain select line.

In other embodiments, the memory cells 122 can be arranged in different types of hierarchies and/or groups than those shown in the illustrated embodiments. Further, although shown in the illustrated embodiments with a certain number of memory cells, rows, columns, blocks, and memory units for purposes of illustration, the number of memory cells, rows, columns, blocks, and memory units can vary, and can, in other embodiments, be larger or smaller in scale than shown in the illustrated examples. For example, in some embodiments, the memory device 100 can include only one memory unit 120. Alternatively, memory device 100 can include two, three, four, eight, ten, or more (e.g., 16, 32, 64, or more) memory units 120. Although the memory units 120 are shown in FIG. 1 as including two memory blocks 128 each, in other embodiments, each memory unit 120 can include one, three, four, eight, or more (e.g., 16, 32, 64, 100, 128, 256 or more memory blocks). In some embodiments, each memory block 128 can include, e.g., 215 memory pages, and each memory page within a block can include, e.g., 212 memory cells 122 (e.g., a "4k" page).

The controller 106 can be a microcontroller, special purpose logic circuitry (e.g., a field programmable gate array (FPGA), an application specific integrated circuit (ASIC), etc.), or other suitable processor. The controller 106 can include a processor 130 configured to execute instructions stored in memory. In the illustrated example, the memory of the controller 106 includes an embedded memory 132 configured to perform various processes, logic flows, and routines for controlling operation of the memory device 100, including managing the main memory 102 and handling communications between the memory device 100 and the host device 108. In some embodiments, the embedded memory 132 can include memory registers storing, e.g., memory pointers, fetched data, etc. The embedded memory 132 can include volatile and/or non-volatile memory (e.g., DRAM, SRAM, NAND, NOR, PCM) for storing the memory registers, and can also include read-only memory (ROM) (e.g., for storing micro-code). Although in the example set forth in FIG. 1, memory device 100 has been illustrated as including a controller 106, in another embodiment of the present technology, a memory device may not include a controller, and may instead rely upon external control (e.g., provided by an external host, or by a processor or controller separate from the memory device).

In operation, the controller 106 can directly write or otherwise program (e.g., erase) the various memory regions of the main memory 102, such as by writing to groups of memory pages and/or memory blocks 128. In NAND-based memory, a write operation often includes programming the memory cells 122 in selected memory pages with specific data values (e.g., a string of data bits having a value of either logic 0 or logic 1). An erase operation is similar to a write operation, except that the erase operation re-programs an entire memory block 128 or multiple memory blocks 128 to the same data state (e.g., logic 1).

The controller 106 communicates with the host device 108 over a host-device interface 110. In some embodiments, the host device 108 and the controller 106 can communicate over a serial interface, such as a serial attached SCSI (SAS), a serial AT attachment (SATA) interface, a peripheral component interconnect express (PCIe), or other suitable interface (e.g., a parallel interface). The host device 108 can send various requests (in the form of, e.g., a packet or stream of packets) to the controller 106. A request can include a command to write, erase, return information, and/or to perform a particular operation (e.g., a TRIM operation). A request can also include an interrupt or another command that indicates a change in condition (e.g., a power loss event), which can trigger the implementation of a power loss algorithm.

Host device 108 can be any one of a number of electronic devices capable of utilizing memory for the temporary or persistent storage of information, or a component thereof. For example, host device may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). Host device 108 may be a networking device (e.g., a switch, a router, etc.) or a recorder of digital images, audio and/or video, a vehicle, an appliance, a toy, or any one of a number of other products. In one embodiment, host device 108 may be connected directly to memory device 100, although in other embodiments, host device 108 may be indirectly connected to memory device (e.g., over a networked connection or through intermediary devices).

In accordance with an embodiment of the present technology, the controller 106 and/or the host device 108 can be configured to verify that the address on which a memory operation (e.g., a read, a write, an erase, etc.) is performed corresponds to an intended address to detect and/or prevent errors in the address information provided to the memory device 100 or the main memory 102 on a command/address bus thereof (e.g., during address translation, during command/address bus operations, etc.) from causing a memory operation to be performed at a different physical address in the main memory 102 than is desired. In this regard, the memory device 100 can include a non-volatile memory 150 in addition to the main memory 102 (which can be volatile, non-volatile, or some combination thereof), in which can be stored location indicia that correspond to addresses in the main memory 102. The location indicia can be used to verify the physical address at which a memory operation on main memory 102 is performed corresponds to the address at which the operation was intended to be performed.

In accordance with an embodiment of the present technology, the location indicia stored in the non-volatile memory 150 can be the full address at which the data is stored. Alternatively, to reduce the amount of storage dedicated to storing the location indicia, it can be a hash, checksum or a subset (e.g., row, bank, rank, device, chip, etc.) of the address at which the data is stored. Using hash, checksum or a subset of the address rather than the whole address, while reducing the amount of storage consumed by the location indicia, can increase the risk of a collision (e.g., if a memory address experiences an error and is inadvertently changed, through a bit error or the like, into a different memory address which generates the same location indicia as the intended memory address). Accordingly, memory systems and devices may be designed according to a balance of storage consumed by the location indicia and tolerance for collisions (e.g., for systems and devices in which there is less tolerance for potential errors caused by collisions, such as vehicular control, life support, or munitions targeting systems, a hash, subset or checksum with a lower collision likelihood, or even the whole address, may be used in generating the location indicia).

According to one aspect of the present technology, a benefit of using a non-volatile memory 150 which is separate from the main memory 102 to store location indicia is the ability to operate the non-volatile memory 150 at a different operating voltage than the main memory 102. Another benefit, in an embodiment in which the main memory 102 is a volatile memory, is the ability of the location indicia stored in the non-volatile memory 150 to persist through a power interruption.

The location in the non-volatile memory 150 at which each location indicia is stored can correspond to the address in the main memory 102 to which the location indicia corresponds. For example, a memory operation which memory device 100 is commanded to perform may include a logical address at which the operation is desired to be performed. The logical address may be decoded by one or more address decoders (e.g., in the controller 106, or in dedicated decoding circuitry, etc.) and the decoded address provided both to the main memory 102 (e.g., to the high-voltage circuits dedicated to sensing or writing the memory cells thereof) and to the non-volatile memory 150. By using the same decoded address in the non-volatile memory 150 and the main memory 102, a location indicia in the non-volatile memory 150 corresponding to the physical address in the main memory 102 can be read out from the non-volatile memory 150 and provided to the controller 106 to verify that the address decoding and transmitting was completed without error, as set forth in greater detail below.

The term “address”, as set forth herein, can mean either a physical address or a logical address. In some embodiments, the location indicia can correspond to either a physical address or a logical address.

To generate and store the location indicia in the non-volatile memory 150, the memory device 100 can use any one of a number of approaches, in accordance with various embodiments of the present technology. In one embodiment, the location indicia can be generated and stored in the non-volatile memory 150 during the manufacture of the memory device 100. In such an embodiment, the non-volatile memory 150 can be a read-only memory (ROM). In another embodiment, the location indicia can be generated and stored in the non-volatile memory 150 during a configuration or operation of the memory device 100. In such an embodiment, the non-volatile memory 150 can be an EEPROM, a flash memory (e.g., NAND, NOR, or the like), a phase change memory (PCM), a ferroelectric or ferromagnetic memory, etc. In such an embodiment, the generation of the location indicia from an address (e.g., the hashing or translation of an address into a location indicia) may be performed either in the controller 106 or in the host 108. Any one of a number of suitable hashing or checksum algorithms well known to those skilled in the art may be used to generate the location indicia, including a cyclic redundancy check (CRC), a longitudinal parity check, a check digit, a parity bit, BSD checksum, or the like.

To verify the address of a memory operation, the memory device can compare the location indicia retrieved from the non-volatile memory 150 (e.g., utilizing the same decoded address, or a portion thereof, provided to the main memory 102) to the address at which a memory operation was intended to occur. For example, if a logical address provided to the memory device 100 is decoded to a physical address in the memory corresponding to block 01, row 01, and column 01 of the main memory 102, the location indicia in row 01 and column 01 of the non-volatile memory can be retrieved and provided to the controller simultaneously with (e.g., or shortly before or shortly after) the data word stored at block 01, row 01 and column 01 of the main memory 102 is retrieved. The location indicia stored at that portion of the non-volatile memory 150 can correspond to the physical address of the main memory 102 (e.g., can be the full address of row 01 column 01, or a subset thereof such as row 01 or column 01, or a hash or checksum thereof, or even the logical address provided to the decoder, a subset, hash or checksum thereof). By providing the location indicia to the controller 106 in response to the memory command (e.g., a read, write or erase), the controller 106 can compare the location indicia to the address to verify that the operation performed on the main memory 102 was performed at the desired address, and that (e.g., if the operation was a read operation) the data retrieved corresponds to the data that was desired. If the location indicia does not correspond to the address, the controller 106 can be further configured to indicate an error (e.g., utilizing an existing or a new protocol on the bus by which the memory device 100 is connected to the host 108, or by a dedicated pin out flagging an error, etc.).

Figure 2:
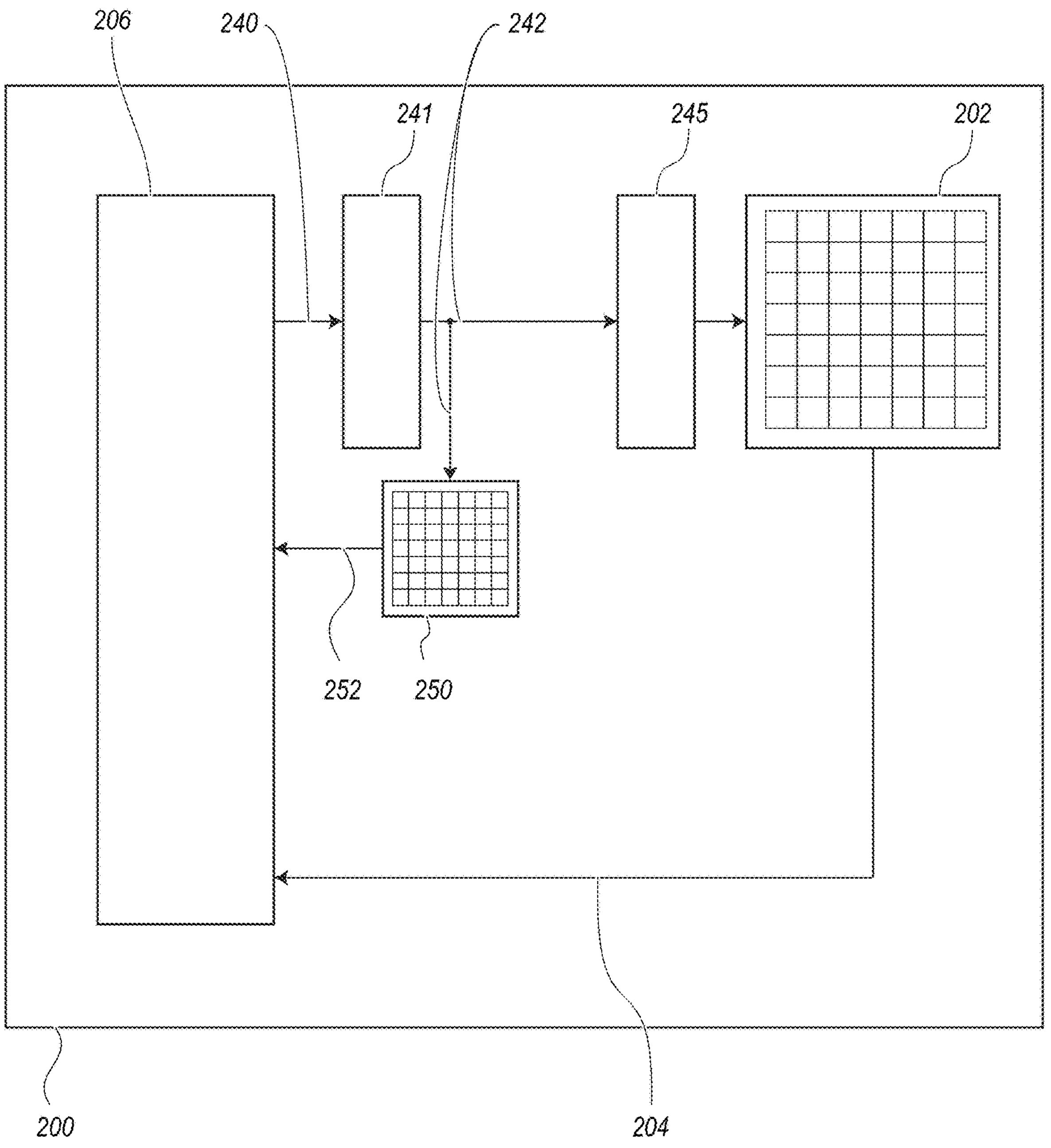
FIG. 2 schematically illustrates a memory device in accordance with an embodiment of the present technology.

Although the foregoing embodiment has illustrated a memory device in which the address decoding is performed by a controller, in other embodiments of the present technology, a memory device may include dedicated address decoding circuitry. For example, FIG. 2 schematically illustrates a memory device 200 in accordance with an embodiment of the present technology, in which a dedicated address decoder is utilized. The memory device 200 includes a memory array 202, a non-volatile memory 250, and a controller 206 configured to verify the address at which a memory operation is performed in the memory array 202. In this regard, the controller 206 is configured to receive a command to perform a memory operation at an address in the memory array 202, and to provide the address 240 to an address decoder 241. The address decoder 241 is configured to decode the address 240 to generate a decoded address 242, which is provided both to the non-volatile memory 250 and to the memory array 202, by way of a high voltage memory access circuit 245 (e.g., including one or more precharge circuits, charge pumps, etc.). The decoded address 242, if correctly generated and transmitted without error, corresponds to the desired location in the memory array 202, as well as a location indicia stored in the non-volatile memory 250 that corresponds to the address 240. If the memory operation is a read operation, then response data 204 is retrieved from the memory array 202 and provided to the controller 206, and the location indicia 252 is retrieved from the non-volatile memory 250 and provided to the controller 206. If the memory operation is a write operation, the controller 206 may not receive response data 204 from the memory array 202, but the controller 206 can still be configured to compare the location indicia 252 to the address 240 to verify that the memory operation was performed in the desired location in the memory array 202. In this embodiment, non-volatile memory 250 can be provided with an amount of storage space sufficient to store a number of location indicia corresponding to the number of addresses in memory array 202.

Figure 3:
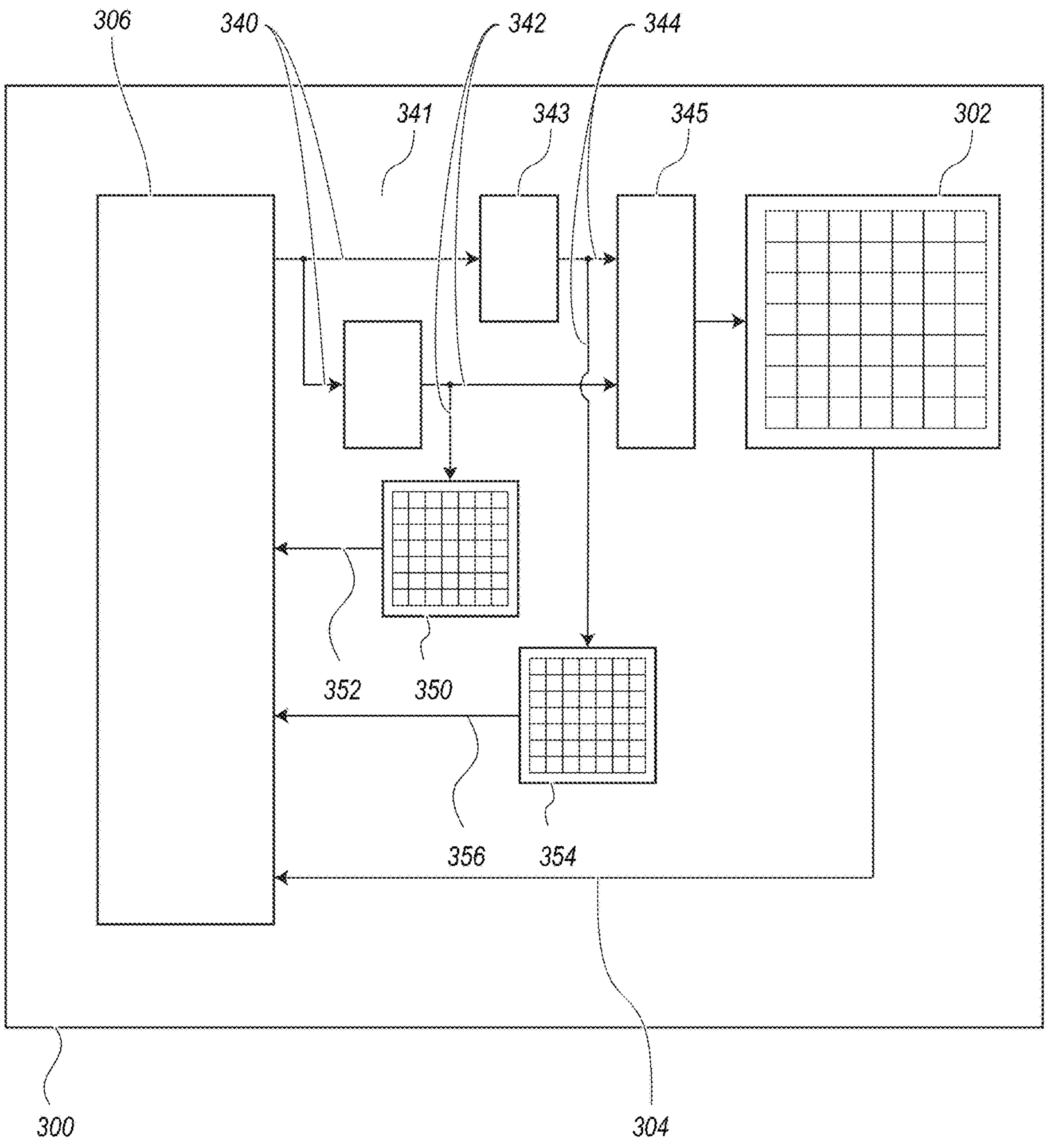
FIG. 3 schematically illustrates a memory device in accordance with an embodiment of the present technology.

Although the foregoing embodiment has described and illustrated a memory device with a single non-volatile memory configured to store location indicia, in other embodiments memory devices may have more than one non-volatile memory so configured. For example, FIG. 3 schematically illustrates a memory device 300 in accordance with an embodiment of the present technology, in which multiple levels of address decoding are performed, with corresponding multiple non-volatile memories configured to store different portions of the decoded address. In this regard, memory device 300 includes a memory array 302, a plurality of non-volatile memories 350 and 354 and a controller 306 configured to verify the address at which a memory operation is performed in the memory array 302. In this regard, the controller 306 is configured to receive a command to perform a memory operation at an address in the memory array 302, and to provide the address 340 to a first address decoder 341 (e.g., a row decoder) and a second address decoder 343. The first address decoder 341 is configured to decode the address 340 to generate a first decoded address 342 (e.g., a row address), which is provided both to the first non-volatile memory 350 and to the memory array 302, by way of a high voltage memory access circuit 345 (e.g., including one or more precharge circuits, charge pumps, etc.). The second address decoder 343 is configured to decode the address 340 to generate a second decoded address 344 (e.g., a column address), which is provided both to the second non-volatile memory 354 and to the memory array 302, by way of a high voltage memory access circuit 345. In this embodiment, each of the first and second non-volatile memories 350 and 354 can be provided with an amount of storage space sufficient to store a number of location indicia corresponding to the number of rows and columns in memory array 302, respectively.

The first and second decoded address 342 and 344, if correctly generated and transmitted without error, correspond to the desired location in the memory array 302, as well as corresponding location indicia stored in the first and second non-volatile memories 350 and 354, that each corresponds to the address 340. If the memory operation is a read operation, then response data 304 is retrieved from the memory array 302 and provided to the controller 306, and the first and second location indicia 352 and 356 are retrieved from the corresponding first and second non-volatile memories 350 and 354 and provided to the controller 306. If the memory operation is a write operation, the controller 306 may not receive response data 304 from the memory array 302, but the controller 306 can still be configured to compare the location indicia 352 and 356 to the address 340 to verify that the memory operation was performed in the desired location in the memory array 302.

In still other embodiments of the present technology, different numbers of address decoders can be provided. For example, in one embodiment a memory device can have three address decoders (e.g., for decoding a block address, a row address, and a column address, respectively). In another embodiment, a memory device could be provided with more than three address decoders. Some or all of the address decoders so provided can be configured to communicate their outputted decoded addresses to non-volatile memories as set forth in greater detail above. In this regard, if only a portion of the address is desired to be verified (e.g., only the row, or only the column, or only the block and row, but not the column), the corresponding non-volatile memory and associated verification steps can be omitted.

Although in the foregoing embodiments, memory devices have been described and illustrated with reference to memory arrays that include a plurality of volatile cells, in other embodiments of the present technology, non-volatile memory arrays may also be used in memory devices in which additional non-volatile memories are provided for storing location indicia. The use of different non-volatile memories for storing location indicia used to verify the addresses at which memory operations are performed enjoys similar benefits as in memory devices in which volatile arrays are included, such as the ability to operate the non-volatile memories at different operating voltages than the main memory array, which can permit different memory technologies to be used for the main array and the non-volatile memories used for storing location indicia, even when these are coupled to the same address decoders.

According to another aspect of the present technology, a memory device configured with a non-volatile memory for storing location indicia can be configured to disable the address verification processes set forth above (e.g., by configuring the memory device in firmware or via a command or pin input), if so desired. The ability to optionally enable or disable the address verification feature can provide desired configurability of power consumption in embodiments in which the power envelope of the memory device is constrained.

Figure 4:
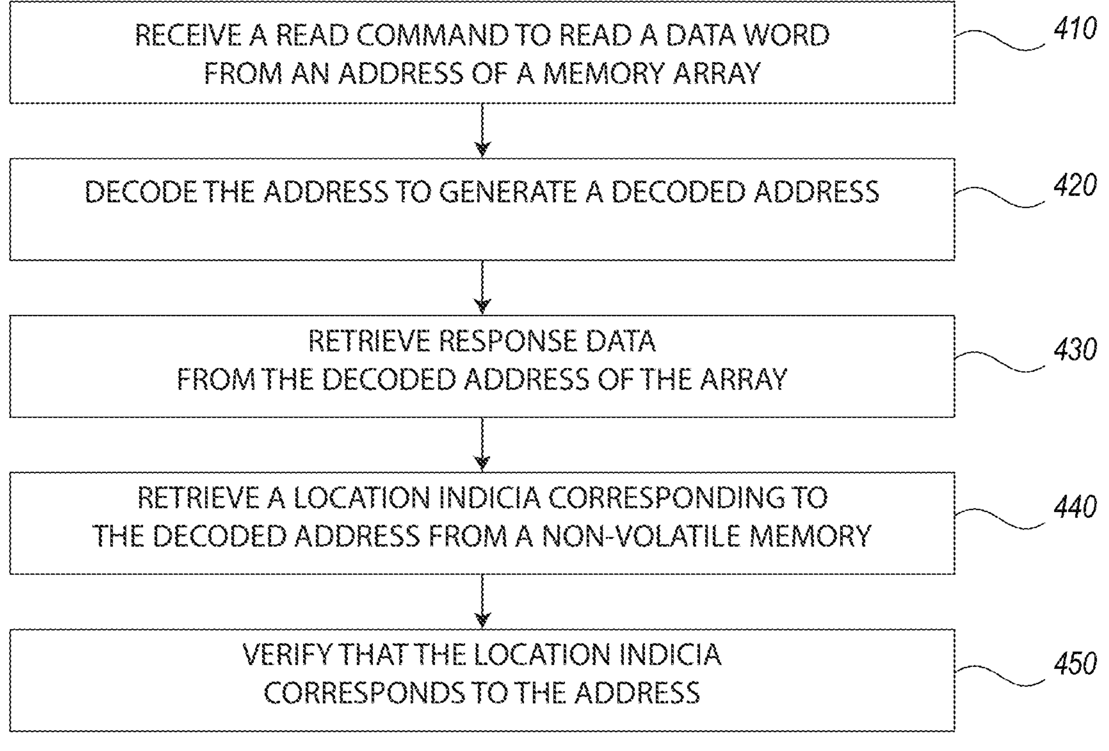
FIG. 4 is a flow chart illustrating a method of operating a memory device in accordance with an embodiment of the present technology.

FIG. 4 is a flow chart illustrating a method of operating a memory device in accordance with an embodiment of the present technology. The method includes receiving a read command to read a data word from an address of a memory array (box 410), decoding the address to generate a decoded address (box 420), and retrieving response data from the decoded address of the array (box 430). The method further includes retrieving a location indicia corresponding to the decoded address from a non-volatile memory (box 440) and verifying that the location indicia corresponds to the address (box 450).

In accordance with another embodiment of the present technology, a method of operating a memory device includes receiving a write command to write a data word to an address of a memory array, and decoding the address to generate a decoded address. The method further includes retrieving a location indicia corresponding to the decoded address from a non-volatile memory and verifying that the location indicia corresponds to the address. In response to verifying that the location indicia corresponds to the address, the method can further include writing the data word to the decoded address.

Figure 5:
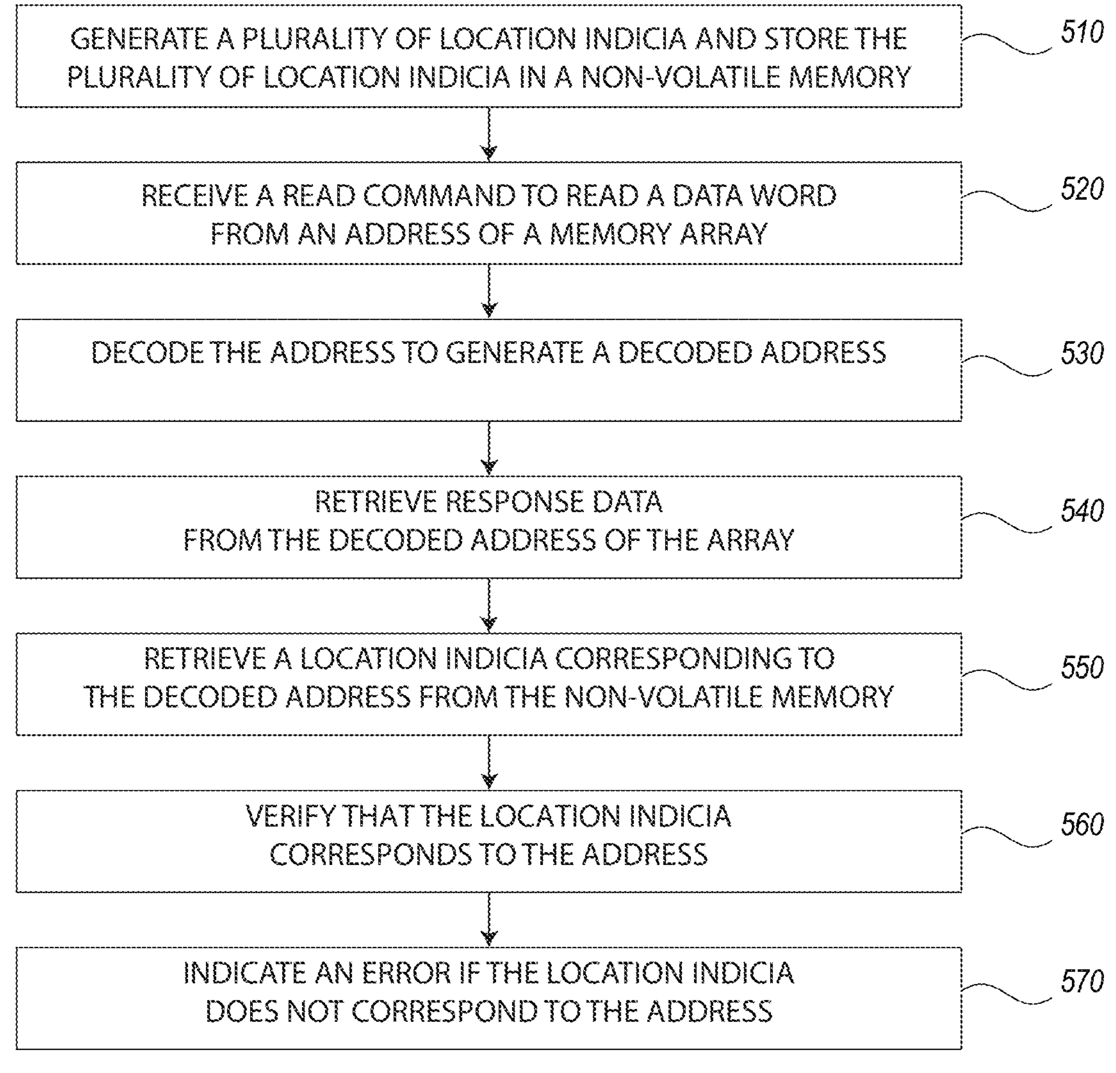
FIG. 5 is a flow chart illustrating a method of operating a memory device in accordance with an embodiment of the present technology.

FIG. 5 is a flow chart illustrating a method of operating a memory device in accordance with an embodiment of the present technology. The method includes generating a plurality of location indicia and storing the plurality of location indicia in a non-volatile memory (box 510). The method further includes receiving a read command to read a data word from an address of a memory array (box 520), decoding the address to generate a decoded address (box 530), and retrieving response data from the decoded address of the array (box 540). The method further includes retrieving a location indicia corresponding to the decoded address from the non-volatile memory (box 550) and verifying that the location indicia corresponds to the address (box 560). The method can further include indicating an error if the location indicia does not correspond to the address.

In accordance with another embodiment of the present technology, a method of operating a memory device includes generating a plurality of location indicia and storing the plurality of location indicia in a non-volatile memory. The method further includes receiving a write command to write a data word to an address of a memory array, and decoding the address to generate a decoded address. The method further includes retrieving a location indicia corresponding to the decoded address from the non-volatile memory and verifying that the location indicia corresponds to the address. The method can further include indicating an error if the location indicia does not correspond to the address. In response to verifying that the location indicia corresponds to the address, the method can further include writing the data word to the decoded address.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. An apparatus, comprising:

a volatile memory device comprising a first array of volatile memory cells;

a non-volatile memory device comprising a second array of non-volatile memory cells; and a controller coupled with the volatile memory device and the non-volatile memory device, and configured to cause the apparatus to:

generate a first physical address of the first array of volatile memory cells based at least in part on a read command indicating a logical address of the first array of volatile memory cells;

read, based at least in part on the first physical address, a location identifier from a second physical address of the second array of non-volatile memory cells, wherein the second physical address of the second array of non-volatile memory cells is a same as the first physical address of the first array of volatile memory cells; and verify that the first physical address was generated without one or more errors based at least in part on determining that the location identifier corresponds to the logical address.

2. The apparatus of claim 1, wherein the controller is further configured to cause the apparatus to:

read a data word from the first physical address of the first array of volatile memory cells based at least in part on generation of the first physical address, wherein, to read the location identifier, the controller is configured to cause the apparatus to read a location indicia from the second physical address of the second array of non-volatile memory cells, wherein verifying that the first physical address was generated without one or more errors is based at least in part on reading the data word from the first array of volatile memory cells and determining that the location indicia corresponds to the logical address.

3. The apparatus of claim 2, wherein:

the location indicia is read before reading the data word, or the location indicia is read after reading the data word.

4. The apparatus of claim 2, wherein the location indicia is read concurrently with reading the data word.

5. The apparatus of claim 2, wherein, to determine that the location indicia corresponds to the logical address, the controller is configured to cause the apparatus to:

determine that the location indicia corresponds to the logical address based at least in part on determining that the location indicia corresponds to the second physical address.

6. The apparatus of claim 2, wherein the location indicia comprises:

the first physical address, a column of the first physical address, a row of the first physical address, a hash of the first physical address, or any combination thereof, or the logical address, a column of the logical address, a row of the logical address, a hash of the logical address, or any combination thereof.

7. The apparatus of claim 1, further comprising:

an access circuit coupled with the controller and the first array of volatile memory cells, the access circuit configured to perform one or more access operations associated with the first array of volatile memory cells, wherein the controller is further configured to operate the access circuit and the first array of volatile memory cells at one or more different voltages than the second array of non-volatile memory cells.

8. The apparatus of claim 7, wherein the controller is further configured to cause the apparatus to:

operate the first array of volatile memory cells and the access circuit at a higher voltage than the second array of non-volatile memory cells.

9. An apparatus, comprising:

a volatile memory device comprising a first array of volatile memory cells;

a non-volatile memory device comprising a second array of non-volatile memory cells; and a controller coupled with the volatile memory device and the non-volatile memory device, and configured to cause the apparatus to:

generate a first physical address of the first array of volatile memory cells based at least in part on a write command indicating a logical address of the first array of volatile memory cells;

read, based at least in part on the first physical address, a location identifier from a second physical address of the second array of non-volatile memory cells, wherein the second physical address of the second array of non-volatile memory cells is a same as the first physical address of the first array of volatile memory cells; and verify that the first physical address was generated without one or more errors based at least in part on determining that the location identifier corresponds to the logical address.

10. The apparatus of claim 9, wherein the controller is further configured to cause the apparatus to:

read a location indicia from the second physical address of the second array of non-volatile memory cells, wherein verifying that the first physical address was generated without one or more errors is based at least in part on determining that the location indicia corresponds to the logical address.

11. The apparatus of claim 10, wherein, to determine that the location indicia corresponds to the logical address, the controller is configured to cause the apparatus to:

determine that the location indicia corresponds to the logical address based at least in part on determining that the location indicia corresponds to the second physical address.

12. The apparatus of claim 10, wherein the location indicia comprises:

the first physical address, a column of the first physical address, a row of the first physical address, a hash of the first physical address, or any combination thereof; or the logical address, a column of the logical address, a row of the logical address, a hash of the logical address, or any combination thereof.

13. The apparatus of claim 9, further comprising:

an access circuit coupled with the controller and the first array of volatile memory cells, the access circuit configured to perform one or more access operations associated with the first array of volatile memory cells, wherein the controller is further configured to operate the access circuit and the first array of volatile memory cells at one or more different voltages than the second array of non-volatile memory cells.

14. The apparatus of claim 13, wherein the controller is further configured to cause the apparatus to:

operate the first array of volatile memory cells and the access circuit at a higher voltage than the second array of non-volatile memory cells.

15. A method, comprising:

generating a first physical address of a first array of volatile memory cells based at least in part on a read command indicating a logical address of the first array of volatile memory cells;

reading, based at least in part on the first physical address, a location identifier from a second physical address of a second array of non-volatile memory cells, wherein the second physical address of the second array of non-volatile memory cells is a same as the first physical address of the first array of volatile memory cells; and verifying that the first physical address was generated without one or more errors based at least in part on determining that the location identifier corresponds to the logical address.

16. The method of claim 15, further comprising:

reading a data word from the first physical address of the first array of volatile memory cells based at least in part on generation of the first physical address, wherein reading the location identifier comprises reading a location indicia from the second physical address of the second array of non-volatile memory cells, wherein verifying that the first physical address was generated without one or more errors is based at least in part on reading the data word from the first array of volatile memory cells and determining that the location indicia corresponds to the logical address.

17. The method of claim 16, wherein:

the location indicia is read before reading the data word, or the location indicia is read after reading the data word.

18. The method of claim 16, wherein the location indicia is read concurrently with reading the data word.

19. The method of claim 16, wherein determining that the location indicia corresponds to the logical address comprises:

determining that the location indicia corresponds to the logical address based at least in part on determining that the location indicia corresponds to the second physical address.

20. The method of claim 16, wherein the location indicia comprises:

the first physical address, a column of the first physical address, a row of the first physical address, a hash of the first physical address, or any combination thereof; or the logical address, a column of the logical address, a row of the logical address, a hash of the logical address, or any combination thereof.

* * * * *